United States Patent
Kristensen et al.

(10) Patent No.: US 10,960,545 B2
(45) Date of Patent: Mar. 30, 2021

(54) METHOD FOR INTERACTIVELY PROVIDING WAYPOINTS TO A MOBILE ROBOT FOR USE IN THE MARKING OF A GEOMETRIC FIGURE ON A GROUND SURFACE

(71) Applicant: TINYMOBILEROBOTS APS, Malling (DK)

(72) Inventors: Jens Peder Kristensen, Malling (DK); Christoffer Praest Mose, Aarhus N (DK); Rudi Hansen, Aarhus C (DK)

(73) Assignee: TINYMOBILEROBOTS APS, Malling (DK)

( * ) Notice: Subject to any disclaimer, the term of this patent is extended or adjusted under 35 U.S.C. 154(b) by 223 days.

(21) Appl. No.: 16/309,108

(22) PCT Filed: Jul. 4, 2017

(86) PCT No.: PCT/EP2017/066591
§ 371 (c)(1),
(2) Date: Dec. 11, 2018

(87) PCT Pub. No.: WO2018/007365
PCT Pub. Date: Jan. 11, 2018

(65) Prior Publication Data
US 2019/0308323 A1 Oct. 10, 2019

(30) Foreign Application Priority Data
Jul. 4, 2016 (DK) .......................... PA 2016 00399

(51) Int. Cl.
*G05B 19/425* (2006.01)
*B25J 9/16* (2006.01)
*G05B 19/4155* (2006.01)

(52) U.S. Cl.
CPC ........ *B25J 9/1684* (2013.01); *G05B 19/4155* (2013.01); *G05B 19/425* (2013.01);
(Continued)

(58) Field of Classification Search
CPC ........ E01C 23/163; E01C 23/22; E01C 23/01; E01C 19/004; E01C 19/006; E01C 23/16;
(Continued)

(56) References Cited

U.S. PATENT DOCUMENTS 6,330,503 B1 * 12/2001 Sharp .................... B05B 12/124
701/50
8,068,962 B2 * 11/2011 Colvard ................ E01C 19/006
701/50

(Continued)

FOREIGN PATENT DOCUMENTS

WO WO 2015/127340 8/2015

OTHER PUBLICATIONS

Trouvain et al., Integrating a multimodal human-robot interaction method into a multi-robot control station, 2001, IEEE, gp. (Year: 2001).*

(Continued)

*Primary Examiner* — McDieunel Marc
(74) *Attorney, Agent, or Firm* — Morse, Barnes-Brown & Pendleton, P.C.; Sean D. Detweiler, Esq.

(57) ABSTRACT

A mobile robot and method for interactively providing waypoints to a mobile robot for use in the marking of a geometric figure on a ground surface including the steps of: i) Selecting a control function accepting manual positioning of a mobile robot at two or more target locations on a ground surface; ii) Positioning the mobile robot in proximity to a first target location to be marked on a surface, and directing a position determining device of the mobile device to said first target location to be marked; iii) Instructing the mobile
(Continued)

robot to store the first target location as a first waypoint; iv) Repeating steps ii)-iii) to obtain at least a second waypoint; v) Selecting a control function accepting manual selection of a geometric figure for being marked on said ground surface; vi) Instructing the mobile robot to compute the best fit for the selected geometric figure on the surface based on the two or more waypoints; vii) Instructing the mobile robot to compute waypoint coordinates of the geometric figure for being marked from the fitted position of said geometric figure; and viii.a) Instructing the mobile robot to store the computed waypoint coordinates of the geometric figure; or viii.b) Instructing the mobile robot to mark the geometric figure on the surface.

15 Claims, 5 Drawing Sheets

(52) U.S. Cl.
CPC .............. *G05B 2219/31048* (2013.01); *G05B 2219/40523* (2013.01); *G05B 2219/45065* (2013.01); *Y02P 90/02* (2015.11)

(58) Field of Classification Search
CPC ...... G01C 15/02; G01C 15/002; G01C 15/04; G01C 1/04; A63C 2203/24; A63C 2019/067; A63C 19/065; G05D 2201/0202; G05D 1/0234; G05D 1/0236; G05D 1/0274; G05D 1/0231; G06K 9/00798; G06K 9/00791; G06K 9/0063; B25J 9/1684; B25J 13/089; B25J 19/021; B25J 5/00; B25J 9/023; B25J 9/161; B25J 9/162; B25J 9/1664; B25J 9/1679; B25J 9/1697; B05B 12/00; B05B 12/124; B05B 13/005; B05B 12/084; B05B 15/555; B25H 7/04; B44D 2/002; B44D 2/007; E02F 9/2045; A63H 13/15; A63H 30/04; B41J 3/28; B41J 3/407; C11D 3/48; G05B 19/425; G05B 2219/39001; G05B 2219/40523; G05B 2219/45065; Y10S 901/43
See application file for complete search history.

(56) References Cited

U.S. PATENT DOCUMENTS

| | | | |
|---|---|---|---|
| 8,467,968 B1* | 6/2013 | Dolinar | G01C 15/04 701/534 |
| 9,230,177 B2 | 1/2016 | Dolinar et al. | |
| 9,298,991 B2* | 3/2016 | Dolinar | G06K 9/00791 |
| 9,784,843 B2* | 10/2017 | Dolinar | E01C 23/01 |
| 10,268,202 B1* | 4/2019 | Casale | G05D 1/0274 |
| 10,301,783 B2* | 5/2019 | Dolinar | E01C 23/163 |
| 2007/0059098 A1* | 3/2007 | Mayfield | E01C 23/163 404/84.5 |
| 2008/0027590 A1* | 1/2008 | Phillips | G05D 1/0088 701/2 |
| 2011/0043515 A1 | 2/2011 | Stathis | |
| 2011/0106339 A1* | 5/2011 | Phillips | G01C 21/20 701/2 |
| 2012/0029870 A1 | 2/2012 | Stathis | |
| 2013/0190981 A1 | 7/2013 | Dolinar et al. | |
| 2015/0190925 A1* | 7/2015 | Hoffman | B25J 9/1671 700/257 |
| 2017/0217021 A1* | 8/2017 | Hoffman | B25J 13/06 |

OTHER PUBLICATIONS

Holloway et al., A robot for spray applied insulation in underfloor voids, 2016, IEEE, p. 313-319 (Year: 2016).*
International Search Report from PCT/EP2017/066591, dated Oct. 10, 2017.
International Search Report from PA 201600399, dated Feb. 9, 2017.

* cited by examiner

METHOD FOR INTERACTIVELY PROVIDING WAYPOINTS TO A MOBILE ROBOT FOR USE IN THE MARKING OF A GEOMETRIC FIGURE ON A GROUND SURFACE

RELATED APPLICATIONS

This application is a national stage filing under 35 U.S.C. 371 of International Application No. PCT/EP2017/066591, filed Jul. 4, 2017, which claims priority to Denmark Application No. PA 2016 00399, filed Jul. 4, 2016. The entire teachings of said applications are incorporated by reference herein.

TECHNICAL FIELD OF THE INVENTION

The present invention relates to a method for interactively providing waypoints to a mobile robot for use in the marking of a geometric figure on a ground surface.

BACKGROUND OF THE INVENTION

Painting temporary and permanent lines are a major task in roadwork and sports areas around the world.

For road work, premarking, marking and remarking center lines, side lines, parking lots, and other road markings on streets and roads and parking areas is important for guiding motorists and to reduce the possibility of accidents both by head on collisions and by vehicles colliding with vehicles, persons or other objects.

In the athletic area premarking, marking and remarking of athletics fields for soccer, football, lacrosse, rugby, ultimate Frisbee and many other types of sport is an important and necessary requirement.

A major part of the striping operation is called "premarking", which today often are done with manual tools like robe, strings, measuring tapes, sticks and spraying tools. For example, measurements are taken with a tape or string from the edge of the roadway, and paint spots are made on the street using a spray can or similar painting device. The result is very time-consuming. In the roadwork it can even be dangerous as the work is done near on-going traffic. Due to the risk involved, the workers must be on constant alert to ongoing vehicle traffic while trying to make the appropriate measurements.

In most cases, markings are done based on previous markings that are remarked using the still visible residues from the old markings. If no residue is visible or a completely new marking is taking place, premarking is often needed to ensure that the marking will be correctly done.

In some cases, it is possible to go directly to marking without premarking. This is the case if sufficient information is available to control a marking machine to do the marking directly. This invention supports both premarking followed by marking and marking directly without a premarking process.

SUMMARY OF THE INVENTION

It is one object of the present invention to provide a pre-marking/marking/remarking method, which would substantially eliminate the need for workers to be positioned on the road during the pre-marking/marking/remarking process.

It is another object of the present invention to provide a pre-marking/marking/remarking method, which is faster and thus more efficient than the manual pre-marking/marking/remarking processes.

It is a further object of the present invention to provide a marking/remarking method without the need for pre-marking.

It is a yet further object of the present invention to provide a pre-marking/marking/remarking method using substantially less work force than in the conventional manual pre-marking/marking/remarking procedures.

One aspect relates to a method for interactively providing waypoints to a mobile robot for use in the marking of a geometric figure on a ground surface comprising the steps of:

i) Selecting a control function accepting manual positioning of a mobile robot at two or more target locations on a ground surface;
ii) Positioning the mobile robot in proximity to a first target location to be marked on a surface, and directing a position determining device of the mobile device to said first target location to be marked;
iii) Instructing the mobile robot to store the first target location as a first waypoint;
iv) Repeating steps ii)-iii) to obtain at least a second waypoint;
v) Selecting a control function accepting manual selection of a geometric figure for being marked on said ground surface;
vi) Instructing the mobile robot to compute the best fit for the selected geometric figure on the surface based on the two or more waypoints;
vii) Instructing the mobile robot to compute waypoint coordinates of the geometric figure for being marked from the fitted position of said geometric figure; and
viii.a) Instructing the mobile robot to store the computed waypoint coordinates of the geometric figure; or
viii.b) Instructing the mobile robot to mark the geometric figure on the surface.

Another aspect relates to a mobile robot comprising:
- a position determining device;
- a first processor;
- a first memory coupled to the first processor, wherein the first memory comprises program instructions for accepting manual positioning of a mobile robot at two or more target locations on a ground surface, as well as manual selection of a geometric figure for being marked on said ground surface; wherein the program instructions are executable by the processor for:
  - storing two or more target locations as waypoints;
  - computing the best fit for the selected geometric figure on the surface based on the stored waypoints;
  - computing waypoint coordinates of the geometric figure for being marked from the fitted position of said geometric figure; and
  - storing the computed waypoint coordinates of the geometric figure.

DETAILED DESCRIPTION OF THE INVENTION

It is one object of the present invention to provide a pre-marking/marking/remarking method, which would substantially eliminate the need for workers to be positioned on the road during the pre-marking/marking/remarking process.

It is another object of the present invention to provide a pre-marking/marking/remarking method, which is faster and thus more efficient than the manual street pre-marking/marking/remarking processes.

It is a yet further object of the present invention to provide a pre-marking/marking/remarking method using substantially less work force than in the conventional manual pre-marking/marking/remarking procedures.

Figure 1:
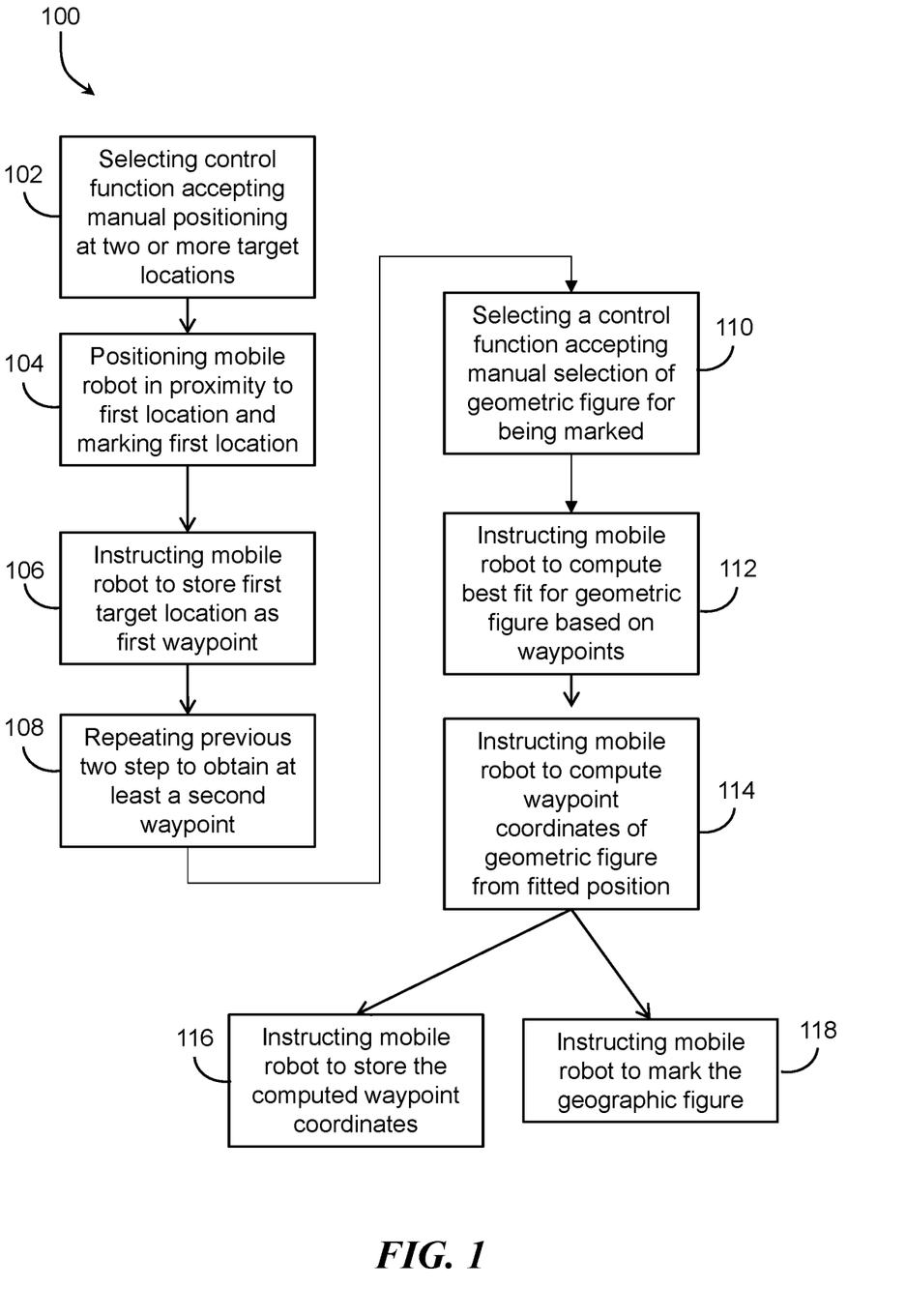
FIG. 1 is a flow chart depicting a methodology in accordance with an embodiment of the present invention.

One embodiment of the invention, as shown in FIG. 1, involves a method 100 for interactively providing waypoints to a mobile robot 200 for use in the marking of a geometric figure on a ground surface comprising the steps of:
i) Selecting a control function accepting manual positioning of a mobile robot at two or more target locations on a ground surface (Step 102);
ii) Positioning the mobile robot in proximity to a first target location to be marked on a surface, and directing a position determining device of the mobile device to said first target location to be marked (Step 104);
iii) Instructing the mobile robot to store the first target location as a first waypoint (Step 106);
iv) Repeating steps ii)-iii) to obtain at least a second waypoint (Step 108);
v) Selecting a control function accepting manual selection of a geometric figure for being marked on said ground surface (Step 110);
vi) Instructing the mobile robot to compute the best fit for the selected geometric figure on the surface based on the two or more waypoints (Step 112);
vii) Instructing the mobile robot to compute waypoint coordinates of the geometric figure for being marked from the fitted position of said geometric figure (Step 114); and
viii.a) Instructing the mobile robot to store the computed waypoint coordinates of the geometric figure (Step 116); or
viii.b) Instructing the mobile robot to mark the geometric figure on the surface (Step 118).

Step v) may be performed before or after any of the steps i)-iv).

A mobile robot 200 may be adapted to move along a series of waypoints, either in a given order or randomly. A waypoint comprises two- or three-dimensional position information and, optionally, two- or three-dimensional orientation information. The mobile robot 200 may be wheeled or tracked 202.

It should be noted that the term "geometric figure" in the context of this application is to be interpreted as meaning a figure of almost any desired shape, such as triangular shapes, straight or curved stripes, straight or curved lines, straight or curved arrows, parabolic shapes, or sports field line marks. Hence, any shape, which may be depicted by line segments, and which may appear in a repeating pattern are included.

Figure 2:
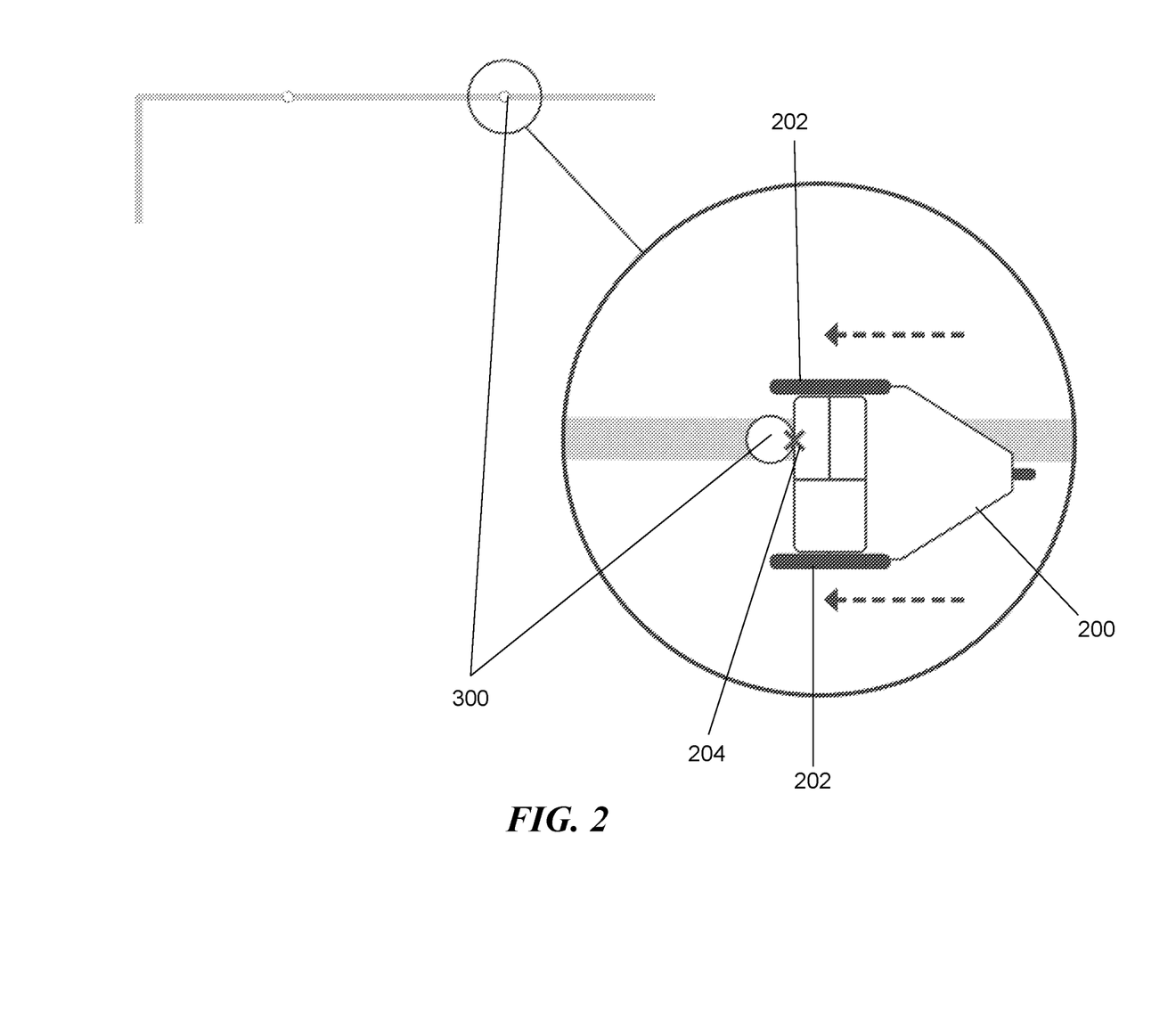
FIG. 2 depicts a mobile robot positioned next to a goal post, which is the first target location in accordance with an embodiment of the present invention.
Figure 3:
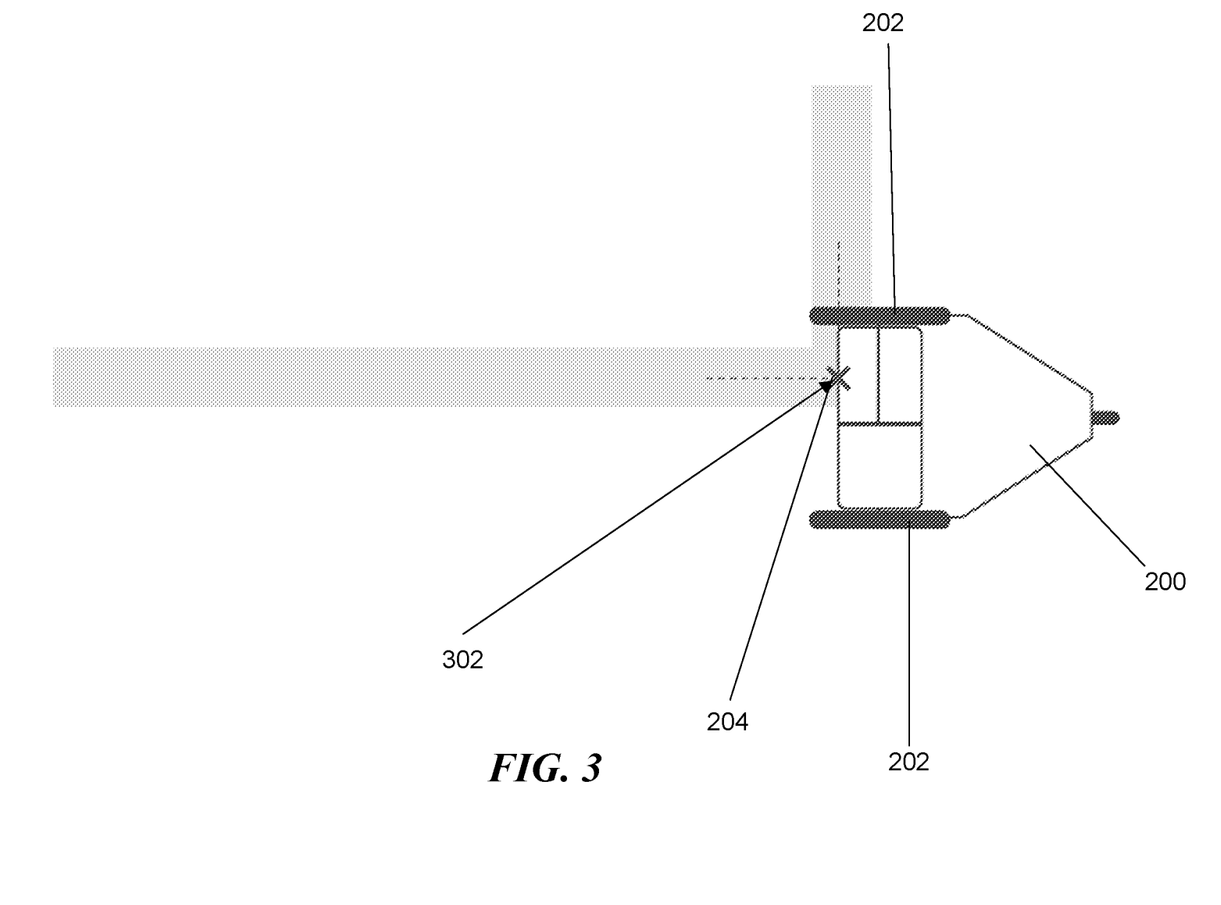
FIG. 3 depicts a collection of a second target location exemplified as a corner of a sports field in accordance with an embodiment of the present invention.
Figure 4:
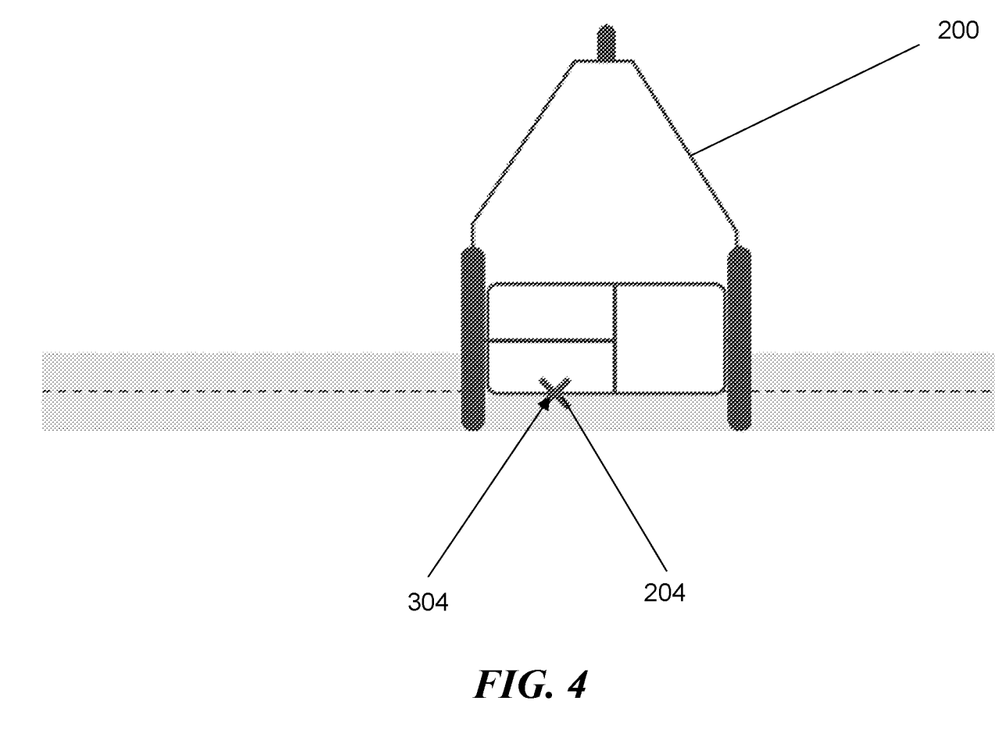
FIG. 4 depicts a collection of a third target location exemplified as the middle of a line width in accordance with an embodiment of the present invention.
Figure 5:
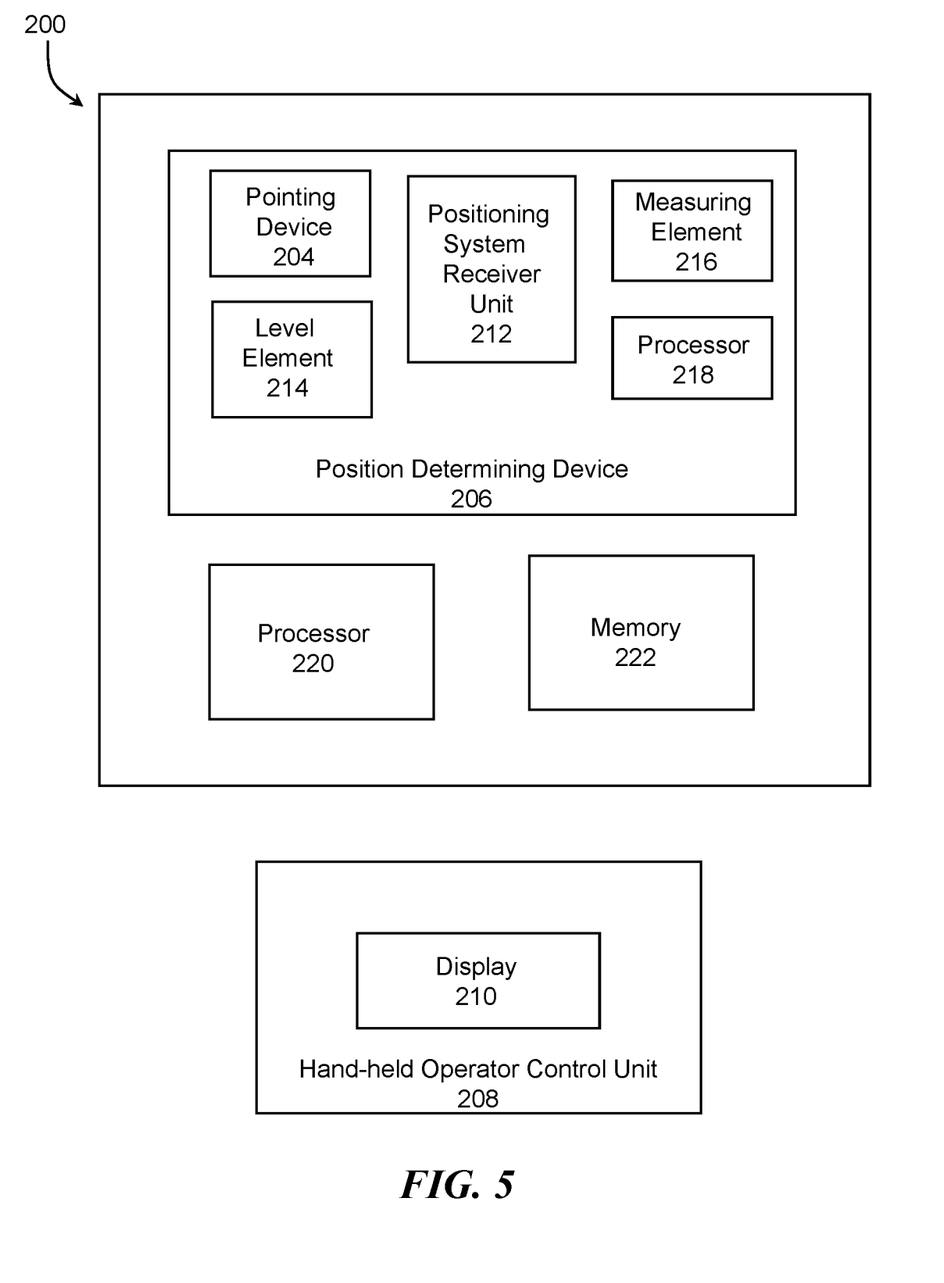
FIG. 5 is system diagram of a mobile robot in accordance with an embodiment of the present invention.

The waypoints are collected by placing the mobile robot 200 on the target location that is to be collected. Examples of this can be seen in FIGS. 2-5. FIG. 2 depicts the mobile robot 200 positioned next to a goal post, which is a first target location 300. FIG. 3 depicts the mobile robot 200 positioned at a corner of a sports field, which is a second target location 302. FIG. 4 depicts the mobile robot 200 positioned at a middle of a line width, which is a third target location 304. FIG. 5 is system diagram of the mobile robot 200. The mobile robot 200 can be placed by driving it manually to the location or by moving it by hand or both. When the mobile robot 200 is at the right location, a pointing device 204 is needed to ensure that the mobile robot 200 is pointing at the precise location. Current mobile robots on the market cannot be more precise than the user's ability to point out the location of any point below or near the mobile robot. This pointing element/device 204 can be mechanical or light based. A possible solution is a laser pointer. Furthermore, it is important that the user of the mobile robot 200 can see the tip of the pointing device 204 or the light emitted by the pointing device. Otherwise, he/she cannot be sure that the right location is collected. Hence, the position determining device 206 should have a pointing device 204 adapted for pointing to a location to be measured; and be mounted on the mobile robot 200 such that the tip of the pointing device 204 or the light emitted by the pointing device 204 is visible for the user of the mobile robot 200 when the user is in an upright position. If the pointing device 204 is positioned below the mobile robot 200, a hole or window should be present in the mobile robot chassis for the user to be able to see the tip or the pointing device 204 or the light emitted by the pointing device. Alternatively, the pointing device 204 is positioned on the rear end of the mobile robot 200, on the front end of the mobile robot 200, or on the side of the mobile robot 200.

In one or more embodiments, the pointing device 204 is light emitting, such as a laser pointer.

In one or more embodiments, the pointing device 204 is a part of a paint spraying means.

In one or more embodiments, such as seen in FIG. 5, the mobile robot 200 comprises a hand-held operator control unit 208 comprising a display means 210; wherein the mobile robot 200 is configured to provide display signals for displaying stored waypoints and optionally the current position of the mobile robot 200 relative thereto, and wherein the display means 210 of the hand-held operator control unit 208 is configured to display said stored waypoints in response to said display signals. This configuration aids to the process of collecting waypoints, as the user can see the position of the robot and the position of previously collected waypoints. When driving to a new target location, the distance to the previous waypoint can be seen allowing the user to choose a waypoint on the ground or reject a waypoint on the ground based on the information on the display means 210. A reason for rejecting a waypoint on the ground may be that the distance does not match with the intended size of an athletic field.

In one or more embodiments, the mobile robot 200 is configured to calculate the distance between stored waypoints, and provide display signals for displaying the distance between stored waypoints.

In one or more embodiments, the mobile robot 200 is configured to calculate a distance between stored waypoints, and provide display signals for displaying a distance between stored waypoints; and wherein the display means of the hand-held operator control unit 208 is configured to display a distance between stored waypoints.

In one or more embodiments, the hand-held operator control unit 208 is configured to provide signals to the mobile robot 200 to delete one or more of said displayed stored waypoints.

It may be a challenge to precisely navigate the mobile robot 200 in proximity to a target location with a hand-held operator control unit 208. This process may be alleviated by introducing a slow mode, which allows the user to drive the mobile robot 200 at a lower speed than normally. This configuration lowers the time for collecting the waypoints, and provides a higher precision in pointing at a target location 300, 302, 304. The slow mode may be activated and deactivated by the hand-held operator control unit. In one or more embodiments, wherein after selecting a control function accepting manual positioning of a mobile robot 200, the mobile robot 200 is configured to move at 30-90% speed compared to normal operation mode, such as within the range of 35-85%, e.g. within the range of 40-80%, such as within the range of 45-80%, e.g. within the range of 50-75%, such as within the range of 55-70%, e.g. within the range of 60-65% speed compared to normal operation mode.

If the highest possible precision is needed, the mobile robot 200 shall read the position of the point and compensate for the tilting of the mobile robot 200 due to the slope of the ground. Compensation of the tilt is possible with a clinometer (tilt angle measurement device) in the mobile robot 200. Based on the reading of the clinometer the correct position of the selected point is calculated by the mobile robot.

In one or more embodiments, the position determining device 206 comprises a positioning system receiver unit 208 configured for receiving a positioning signal.

In one or more embodiments, the position determining device 206 comprises a pointing element/device 204 adapted for pointing to a location to be measured. The pointing element 204 is preferably suspended in a suspension device adapted for vertically positioning the pointing element/device 204.

In one or more embodiments, the position determining device comprises:
- a positioning system receiver unit 212 configured for receiving a positioning signal; and
- a pointing element 204 adapted for pointing to a location to be measured.

In one or more embodiments, the position determining device 206 comprises a pointing device 204 adapted for pointing to a location to be measured, and wherein the pointing device is suspended in a suspension device adapted for vertical positioning of the pointing element/device 204.

In one or more embodiments, the pointing device 204 comprises a tilt angle measurement device 214.

The tilt angle measurement device 214 can comprise an electronic tilt measurement device. The electronic tilt measurement device can comprise a single angle measurement device or a dual angle measurement device.

In one or more embodiments, the distance of the phase center of the positioning system receiver unit 212 from the pointing element 204 is known.

In one or more embodiments, the position determining device 206 comprises:
- a measuring element 216 for measuring the distance between the location to be measured and the mobile robot 200; and
- a processor 218 coupled to receive a) the positioning information signal from the positioning system receiver unit 212, and b) the distance between the location to be measured and the mobile robot 200, wherein said processor is configured for computing the position of the location to be measured.

In one or more embodiments, the position determining device 206 comprises:
- a positioning system receiver unit 212 configured for receiving a positioning (e.g. GNSS) signal;
- a pointing element 204 for pointing to a location to be measured;
- a measuring element 216 for measuring the distance vector between the location to be measured and the mobile robot 200; and
- a processor 218 coupled to receive a) the positioning information signal from the positioning system receiver unit 212, and b) the distance vector between the location to be measured and the mobile robot 200, wherein said processor is configured for computing the position of the location to be measured.

In one or more embodiments, the position determining device 206 comprises:
- a positioning system receiver unit 212 configured for receiving a position (e.g. GNSS) signal;
- a pointing element 204 for pointing to a location to be measured;
- a measuring element 216 for measuring the distance vector between the location to be measured and the mobile robot 200;
- a level element 214 that determines the tilt of the mobile robot 200; and
- a processor coupled to receive a) the positioning information signal from the positioning system receiver unit 212, b) the distance vector between the location to be measured and the mobile robot 200, and c) the tilt of the mobile robot, wherein said processor 218 is configured for computing the position of the location to be measured.

The mobile robot 200 may in one or more embodiments comprise a positioning system configured for receiving a GNSS signal. Global Navigation Satellite Systems (GNSS) is a collective term for a variety of satellite navigation systems, which use orbiting satellites as navigation reference points to determine position fixes on the ground. GNSS includes the Global Positioning System (GPS), the Global Navigation Satellite System (GLONASS), the Compass system, Galileo, and a number of Satellite based augmentation systems (SBAS).

In typical civilian applications, a single GNSS receiver can measure a ground position with a precision of about ten meters. This is, in part, due to various error contributions, which often reduce the precision of determining a position fix. For example, as the GNSS signals pass through the ionosphere and troposphere, propagation delays may occur. Other factors, which may reduce the precision of determining a position fix, may include satellite clock errors, GNSS receiver clock errors, and satellite position errors. One method for improving the precision for determining a position fix is Real-Time Kinematic (RTK) GNSS. Real Time Kinematic (RTK) satellite navigation is a technique using the phase of the signal's carrier wave, rather than the information content of the signal, and relies on a single reference station or interpolated virtual station to provide real-time corrections.

In one or more embodiments, the mobile robot 200 comprises a retroreflector, and wherein the positioning system receiver unit configured for receiving a positioning (e.g. GNSS) signal receives the position signal from a total station.

In one or more embodiments, the mobile robot 200 comprises a Real Time Kinematic (RTK) GNSS positioning system.

In one or more embodiments, the retroreflector and/or the RTK GNSS positioning system are positioned on an elongate member extending upward from a base of the mobile robot. This is an advantage to make the retroreflector more visible for the emitter/receiver unit in the total station. Furthermore, the RTK GNSS positioning system will be more visible for the satellites.

In one or more embodiments, the elongate member is height adjustable, e.g. comprising telescoping elongate members.

In one or more embodiments, the RTK positioning system is positioned above the retroreflector. This is to avoid shielding by the retroreflector.

In one or more embodiments, the measuring element 216 is a sonic-based measuring device or a laser-based measuring device.

In one or more embodiments, the pointing element 204 is a laser pointer, a mechanical pointer, or an optical plummet.

In one or more embodiments, the position determining device 206 comprises a pointing device 204 and positioning system 212 positioned on the mobile robot 200, and disposed offset at a known distance relative to one another; wherein the mobile robot 200 comprises a gyro sensor configured for determining the rotation angular velocity of the mobile robot 200; wherein the position determining device 206 is configured to determine the point to which the pointing device 204 is pointing from information relating to the historical path of the mobile robot 200 and the actual information from the gyro sensor Another aspect relates to a mobile robot comprising:
a position determining device 206;
a first processor 220;
a first memory 222 coupled to the first processor 220, wherein the first memory 22 comprises program instructions for accepting manual positioning of a mobile robot 200 at two or more target locations 300, 302, 304 on a ground surface, as well as manual selection of a geometric figure for being marked on said ground surface; wherein the program instructions are executable by the processor 220 for:
storing two or more target locations 300, 302, 304 as waypoints;
computing the best fit for the selected geometric figure on the surface based on the stored waypoints;
computing waypoint coordinates of the geometric figure for being marked from the fitted position of said geometric figure; and
storing the computed waypoint coordinates of the geometric figure.

In one or more embodiments, the position determining device 206 comprises:
a positioning system receiver unit 212 configured for receiving a GNSS signal;
a pointing element 204 for pointing to a location to be measured;
a measuring element 216 for measuring the distance between the location to be measured and the mobile robot; and
a second processor 218 coupled to receive a) the positioning information signal from the positioning system receiver unit 212, and b) the distance between the location to be measured and the mobile robot 200, wherein said second processor 218 is configured for computing the position of the location to be measured.

In one or more embodiments, the mobile robot 200 comprises a retroreflector, and wherein the positioning system receiver unit is configured for receiving a positioning (e.g. GNSS) signal from a total station.

In one or more embodiments, the mobile robot 200 further comprises means configured for marking a geometric figure on a surface based on waypoint coordinates.

In one or more embodiments, the step of computing the best fit for the geometric figure is based on a plurality of stored waypoints, such as two, three, four, five, six, seven, eight, nine, or ten stored waypoints.

In one or more embodiments, the geometric figure comprises a curved element, wherein the step of computing the best fit for the geometric figure is based on a plurality of stored waypoints, and wherein the best fit operation comprises the step of curve fitting the curved element based on said plurality of stored waypoints.

In the present context, the curve fitting operation is to be understood as the process of constructing a curve, or mathematical function, that has the best fit to a series of data points (target locations), preferably subject to pre-defined constraints.

In one or more embodiments, the computed and stored waypoints of the geometric figure for being marked includes predefined reference points defining specific positions on said geometric figure, such as a center point or midline. Such information may be used by the mobile paint marking machine for proper positioning.

In one or more embodiments, the program code, when executed, further causes the one or more processors 220, 218 to perform the step of:
making the geographic coordinates of the geometric figure for being marked available for a mobile paint marking machine.

In one or more embodiments, the positioning system receiver unit comprises a real time kinematic (RTK) GNSS receiver.

It should be noted that embodiments and features described in the context of one of the aspects of the present invention also apply to the other aspects of the invention.

The invention claimed is:

1. A method for interactively providing waypoints to a mobile robot for use in the marking of a geometric figure on a ground surface comprising the steps of:
   i) selecting a control function on a control unit of said mobile robot accepting manual positioning of the mobile robot at two or more target locations on the ground surface, wherein the mobile robot comprises a position determining device comprising a pointing device with a tip or a light emitter that is adapted for pointing to a target location to be measured, and wherein the pointing device is mounted on the mobile robot such that said tip of said pointing device or the light emitted by the light emitter is visible for the user of said mobile robot when the user is in an upright position;
   ii) positioning, manually or via the control unit, the mobile robot in proximity to a first target location to be marked on the surface, and directing the tip of the pointing device or light emitter mounted on the mobile device toward a first target location to be marked, the directing operation being performed by tilting the tip or light emitter, or by re-positioning said mobile robot such that the tip or light emitter is pointing towards said first target;
   iii) instructing the mobile robot, via the control unit, to store the first target location as a first waypoint;

iv) repeating steps ii)-iii) to obtain at least a second waypoint;
v) selecting a control function on the control unit of the mobile robot accepting manual selection of a geometric figure for being marked on said ground surface;
vi) instructing the mobile robot to compute via the control unit, the best fit for the selected geometric figure on the surface based on the two or more waypoints;
vii) instructing the mobile robot, via the control unit, to compute waypoint coordinates of the geometric figure for being marked from the best fit position of said geometric figure on the surface; and
viii.a) instructing the mobile robot, via the control unit, to store the computed waypoint coordinates of the geometric figure; or
viii.b) instructing the mobile robot, via the control unit, to mark the geometric figure on the surface.

2. The method according to claim 1, wherein the pointing device is a part of a paint spraying means.

3. The method according to claim 1, wherein the mobile robot comprises a hand-held operator control unit comprising a display means; wherein the mobile robot is configured to provide display signals for displaying the stored waypoints and the current position of the mobile robot relative thereto; and wherein the display means of the hand-held operator control unit is configured to display said stored waypoints and the current position of the mobile robot relative thereto in response to said display signals.

4. The method according to claim 3, wherein the hand-held operator control unit is configured to provide signals to the mobile robot to delete one or more of said displayed and stored waypoints.

5. The method according to claim 1, wherein after selecting a control function, via the control unit, accepting manual positioning of a mobile robot, the mobile robot is configured to move at 30-90% speed compared to normal operation mode.

6. The method according claim 1, wherein the position determining device comprises the pointing device and positioning system positioned on the mobile robot, and disposed offset at a known distance relative to one another; wherein the mobile robot further comprises a gyro sensor configured for determining the rotation angular velocity of the mobile robot; wherein the position determining device is configured to determine the target point to which the pointing device is pointing from information relating to the historical path of the mobile robot and the actual information from the gyro sensor.

7. A mobile robot configured for use in the marking of a geometric figure on a ground surface, the mobile robot comprising:
a paint spraying means;
a position determining device;
comprising a pointing device with a tip or a light emitter adapted for pointing to a target location to be measured on the ground, wherein the pointing device is mounted on the mobile robot such that the tip of the pointing device or the light emitted by the pointing device is visible for the user of the mobile robot when the user is in an upright position;
a control unit in communication with said mobile robot;
a first processor;
a first memory coupled to the first processor, wherein the first memory comprises program instructions configured for accepting, via the control unit, manual positioning of the mobile robot at two or more target locations on the ground surface, as well as accepting manual selection, via the control unit, of a geometric figure for being marked on said ground surface; wherein the program instructions are executable by the processor for:
storing two or more target locations as waypoints;
computing the best fit for the selected geometric figure on the surface based on the stored waypoints;
computing waypoint coordinates of the geometric figure for being marked from the fitted position of said geometric figure; and
storing the computed waypoint coordinates of the geometric figure.

8. The mobile robot according to claim 7, wherein the pointing device is a part of the paint spraying means.

9. The mobile robot according to claim 7, wherein the computed and stored waypoints of the geometric figure for being marked includes predefined reference points defining specific positions on said geometric figure.

10. The mobile robot according to claim 7, wherein the paint spraying means is configured for marking the geometric figure on the surface based on the waypoint coordinates.

11. The mobile robot according to claim 7, wherein the position determining device comprises:
a positioning system receiver unit configured for receiving a positioning signal;
a measuring element for measuring the distance between the location to be measured and the mobile robot;
a level element that determines a tilt of the mobile robot; and
a processor coupled to receive a) the positioning information signal from the positioning system receiver unit, b) the distance between the location to be measured and the mobile robot, and c) the tilt of the mobile robot, wherein said processor is configured for computing the position of the target location to be measured.

12. The mobile robot according to claim 7, wherein the control unit is a hand-held operator comprising a display means wherein the mobile robot is configured to provide display signals for displaying the stored waypoints and the current position of the mobile robot relative thereto, and wherein the display means is configured to display said stored waypoints and the current position of the mobile robot relative thereto in response to said display signals.

13. The mobile robot according to claim 12, wherein the hand-held operator control unit is configured to provide signals to the mobile robot to delete one or more of said displayed stored waypoints.

14. The mobile robot according to claim 12, wherein the mobile robot is configured to calculate a distance between the stored waypoints, and provide display signals for displaying the distance between the stored waypoints, and wherein the display means of the hand-held operator control unit is configured to display the distances between the stored waypoints.

15. The mobile robot according to claim 7, wherein receiving instruction, via the control unit, for manual positioning of a mobile robot, the mobile robot is configured to move at 30-90% speed compared to normal operation mode.

* * * * *